US005361708A

United States Patent [19]

Barnes

[11] Patent Number: 5,361,708

[45] Date of Patent: Nov. 8, 1994

[54] APPARATUS AND METHOD FOR PASTEURIZING AND DRYING SLUDGE

[76] Inventor: Alva D. Barnes, 7815 Forest Briar, San Antonio, Tex. 78233

[21] Appl. No.: 15,409

[22] Filed: Feb. 9, 1993

[51] Int. Cl.[5] .............. A47J 36/00

[52] U.S. Cl. .............. 110/246; 432/114; 432/115

[58] Field of Search .............. 432/103, 105, 114; 110/246

[56] References Cited

U.S. PATENT DOCUMENTS

| | | | |
|---|---|---|---|
| 545,121 | 8/1895 | Cummer . | |
| 575,258 | 12/1896 | Hogan . | |
| 581,686 | 5/1897 | De Berard . | |
| 1,099,330 | 6/1914 | Woollacott et al. . | |
| 1,321,332 | 11/1919 | Prindle . | |
| 1,459,302 | 6/1923 | Hermann . | |
| 1,469,294 | 10/1923 | Daman . | |
| 1,938,832 | 12/1933 | Hougen et al. | 432/114 |
| 2,151,320 | 3/1939 | Forni . | |
| 2,699,620 | 1/1955 | Wandel . | |
| 2,862,462 | 12/1958 | Brandt et al. . | |
| 2,864,672 | 12/1958 | Brooks . | |
| 3,357,382 | 12/1967 | Matteini | 110/246 |
| 3,716,002 | 2/1973 | Porter et al. . | |
| 4,052,151 | 10/1977 | Reichrt et al. | 110/246 |
| 4,066,024 | 1/1978 | O'Connor | 110/246 |
| 4,339,999 | 7/1982 | Fio Rito et al. . | |
| 4,639,217 | 1/1987 | Adams . | |
| 4,881,947 | 11/1989 | Parker et al. | 432/114 |
| 4,970,803 | 11/1990 | Keller . | |
| 5,203,693 | 4/1993 | Swanson | 432/115 |
| 5,242,245 | 9/1993 | Schellstede . | |
| 5,242,246 | 9/1993 | Manchak, III et al. . | |
| 5,245,762 | 9/1993 | Hartis et al. . | |
| 5,251,383 | 10/1993 | Williams . | |

OTHER PUBLICATIONS

"Bartlett-Snow Rotary Dryer Components", one page, undated.

Baker, C. et al., "A Low-cost Strategy for Reducing Fuel Consumption of Dryers", *Process Engineering*, Mar. 1983, pp. 42–44.

Cook, Edward M., "New Ideas to Improve Dryer Performance", *Chemical Engineering*, May 9, 1988, pp. 71–78.

Dittman, F. W., "How to Classify a Drying Process", *Chemical Engineering*, Jan. 17, 1977, pp. 106–108.

Marinelli, J., et al., "Solve Solid Flow Problems in Bins, Hoppers, and Feeders", *Chemical Engineering*, May 1992, pp. 22–28.

Marinelli, J., et al, "Use Srew Feeders Effectively", *Chemical Engineering Progress*, Dec. 1992, pp. 47–51.

Moyers, Charles G., "Don't Let Dryer Problems Put You Through the Wringer", *Chemical Engineering Progress*, Dec. 1992, pp. 34–46.

Novak, John T., et al., "Stabilization of Sludge From An Oxidation Ditch", *Journal WPCF*, vol. 56, No. 8, pp. 950–954.

Papaginnes, George J., "Select the Right Dryer", *Chemical Engineering Progress*, Dec. 1992, pp. 19–27.

Robinson, John W., "Improve Dryer Control", *Chemical Engineering Progress*, Dec. 1992, pp,. 28–33.

Root, William L., "Indirect Drying of Solids", *Chemical Engineering*, May 2, 1983, pp. 52–64.

*Primary Examiner*—Henry C. Yuen

*Attorney, Agent, or Firm*—Trask, Britt & Rossa

[57] ABSTRACT

A device for applying heat to sludge, including a rotating tubular chamber having a hollow-centered helical auger on its interior to move the sludge longitudinally through the chamber, and a gas distribution tube extending through the center of the chamber. Hot gas is injected into the chamber through outlets in the wall of the distribution tube, and sludge, which has been raised by lifters on the interior of the rotating chamber, falls through the hot gas streams from the outlets to dry and pasteurize the sludge. Chambers may be used in series, with the discharge from one chamber feeding the inlet of the next.

21 Claims, 6 Drawing Sheets

APPARATUS AND METHOD FOR PASTEURIZING AND DRYING SLUDGE

BACKGROUND OF THE INVENTION

1. Field of the Invention

The present invention relates generally to an apparatus and method for pathogen concentration reduction in and dehydration of sludge derived from a waste water or sewage treatment process, and more specifically to a means and method for significantly reducing the water, bacterial and viral content of such sludge at a relatively low temperature in a rapid, inexpensive manner adaptable to a wide variety of existing treatment facilities and capable of accommodating relatively high sludge volumes on a continuous basis.

2. State of the Art

Technology for, and adaptable to, drying moisture-containing waste and other materials of various origins has been in existence in many forms for almost a century. Examples of many prior art drying devices appear in U.S. Pat. Nos. 545,121; 572,258; 581,686; 1,099,330; 1,321,332; 1,459,302; 1,469,294; 2,151,320; 2,699,620; 2,862,462; 2,864,672; 3,716,002; 4,339,999; 4,639,217; and 4,970,803.

All of the prior art devices as exemplified in the above-referenced patents possess substantial deficiencies in their applicability to sludge drying. For example, the majority require installation of a substantial number of permanent foundation and structural support components on site, in addition to the actual operating components. The simpler prior art devices are not suited for receiving sludge on a continuous basis, and are quite limited in their batch capacity. All of the prior art devices require a fabrication or purchase of complex, relatively expensive components. Moreover, the sheer spatial volume of some of the prior art devices, and the multi-element nature of others renders them difficult, if not impossible, to install at existing waste treatment facilities where space is at a premium. Finally, most existing devices operate at very high, furnace-like temperatures which incinerate, rather than just dry, the material under treatment. Such an approach, in addition to requiring massive and costly energy input, can generate significant air pollution, both in the form of particulates and of toxic gases. Under current government environmental regulations, the gaseous output of the high temperature prior art devices requires costly scrubbing apparatus and other air pollution control devices to meet air quality standards. The air pollution problem is aggravated if the waste to be treated, as is many times the case with sludge, contains heavy metals and/or other toxins which are readily vaporized at high temperatures.

In recent years, more stringent government regulation of waste disposal procedures and the resulting need to minimize the sludge volume to ultimately be disposed of has resulted in a need for a sludge drying apparatus which is relatively simple in construction, straightforward in operation and easy to install at a variety of sites, both new and existing, of various diverse configurations. Very recently implemented legislation requiring pathogen concentration reduction in waste water or sewage sludge prior to application to the land or other ultimate disposition has compounded the problem of sludge treatment, and the prior art technology fails to provide the necessary solutions for high sludge volumes and at a relatively low cost.

SUMMARY OF THE INVENTION

The present invention comprises an apparatus and method for treatment of sludge which overcomes the deficiencies of the prior art technology and which can effectively address the new and ever-more restrictive regulations for sludge treatment being imposed by Federal, state and local government agencies.

The sludge treatment apparatus of the present invention comprises a rotatable tubular pasteurization chamber through which sludge is transported for drying and pathogen reduction by contact with hot gases introduced throughout the length of the chamber by a stationary, substantially coaxial hot gas distribution tube.

The tubular pasteurization chamber is preferably supported for rotation at a plurality of locations on trunnion assemblies supporting multiple bearings on which ride the pasteurization chamber, preferably through roller structures surrounding and secured to the exterior of the chamber. The interior of the pasteurization chamber includes a sludge transport means substantially extending the length thereof, such transport means preferably being a hollow-centered, helically configured auger means secured within the chamber and having an inner diameter larger than the outer diameter of the gas distribution tube. Also on the interior of the pasteurization chamber are a plurality of longitudinally extending and circumferentially spaced sludge lifters. The pasteurization chamber is rotationally driven at a substantially constant speed by a drive means including a prime mover, such as an electric motor, and any suitable power takeoff, such as a gear drive, chain or belt drive. A sludge feed means, such as a hopper, at one end of the chamber introduces sludge for treatment, and treated sludge is ejected via one or more discharge ports at the opposite chamber end.

The gas distribution tube is supported beyond each end of the pasteurization chamber and independently therefrom, and hot gas is introduced at one end of the tube for distribution throughout the pasteurization chamber via apertures or orifices placed through the wall of the tube along substantially the entire extent thereof residing within the chamber in a circumferential sector of the tube located (measured from top dead center) from about 120 degrees to about 300 degrees, taken in the direction of rotation of the pasteurization chamber. The hot gas is preferably provided by a multi-fuel gas burner and dilution air fan combination which, responsive to a thermocouple or other heat sensor control disposed within the hot gas distribution tube, is employed to control the hot gas temperature. The fuel supply to the burner may be controlled by a second thermocouple or sensor placed within the chamber to measure the actual temperature of the sludge therein.

In operation, sludge in cake or paste form which has previously been dewatered to a solids content of about ten to thirty-five percent is fed into one end of the pasteurization chamber via the aforementioned feed means, which may comprise a belt, bucket or screw feed, or other suitable means known in the art to effect a continuous feed, in lieu of a hopper for manual feed as previously noted. The rotation of the pasteurization chamber by the drive means causes the sludge transport means to move the sludge longitudinally in the chamber, while the sludge lifters lift the sludge as they rotate upwardly inside the chamber until a point is reached where the sludge is released and falls downwardly to the bottom of the chamber through the hot gas streams being injected into the chamber via the distribution tube. Much of the effectiveness of the drying and pasteurizing operation is attributable to the sludge's free fall through the hot gas streams, rather than merely slumping downwardly against the interior of the pasteurization chamber. As the sludge progresses toward the exit end of the pasteurization chamber its water content is reduced, as is its pathogen content. Upon reaching the exit end, the transport means conveys the treated sludge to one or more discharge outlets in the wall of the chamber or, alternatively, out of the end of the chamber. The treated sludge, depending upon initial water content, may have a solids content of twenty to fifty percent, as well as the desired minimal bacterial and viral pathogen concentration.

The sludge treatment apparatus of the present invention may include only a single pasteurization chamber fabricated to a length so that the sludge reaches the desired water content and reduced pathogen concentration by the time it reaches the discharge end of the chamber. However, it is also contemplated and preferred that a modular approach to the invention may be taken, wherein two or more shorter treatment modules, each having a pasteurization chamber, gas distribution tube, hot gas source and drive means may be employed in series, with the sludge discharge of each module feeding the inlet of the next module of the series. It is contemplated that the preferred embodiment of the invention may comprise three substantially horizontally oriented, mutually parallel treatment modules in series stacked one above the next but in opposing sludge transport direction so that the discharge of the uppermost module is located to feed the inlet of the module immediately beneath it, and the discharge of that module feeding the inlet of the lowermost. Each module includes its own hot gas distribution tube in communication with either a common or individual hot gas supply. All three treatment modules may have individual drives, but it is preferred that they share a common drive means so that only a single motor is required and all chambers are thus caused to rotate at a substantially common or uniform speed. In such a configuration, the treatment modules may be mounted on a supporting framework which is easily transportable via trailer or on a skid unit, and which minimizes the site area required for installation as well as avoiding the requirement of significant site preparation for installation.

DETAILED DESCRIPTION OF THE ILLUSTRATED EMBODIMENTS

Figure 1:
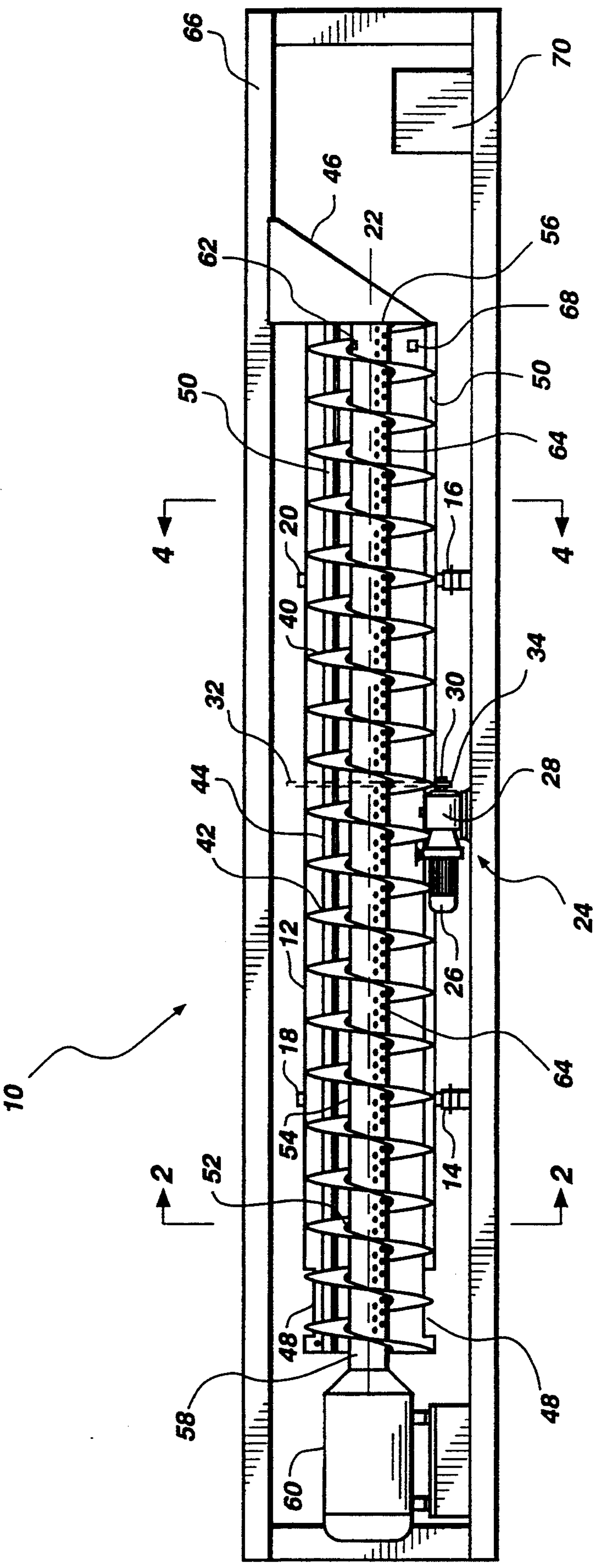
FIG. 1 comprises a side partial sectional elevation of a preferred embodiment of the sludge treatment apparatus of the present invention.
Figure 2:
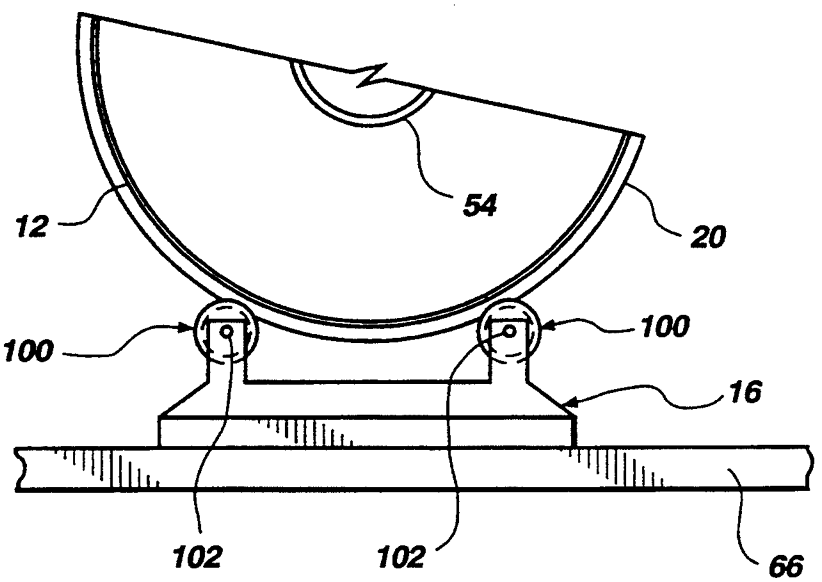
FIG. 2 comprises an enlarged partial sectional end view taken through FIG. 1 along section line 2—2 of the pasteurization chamber supported by one of the rotational support means.
Figure 3:
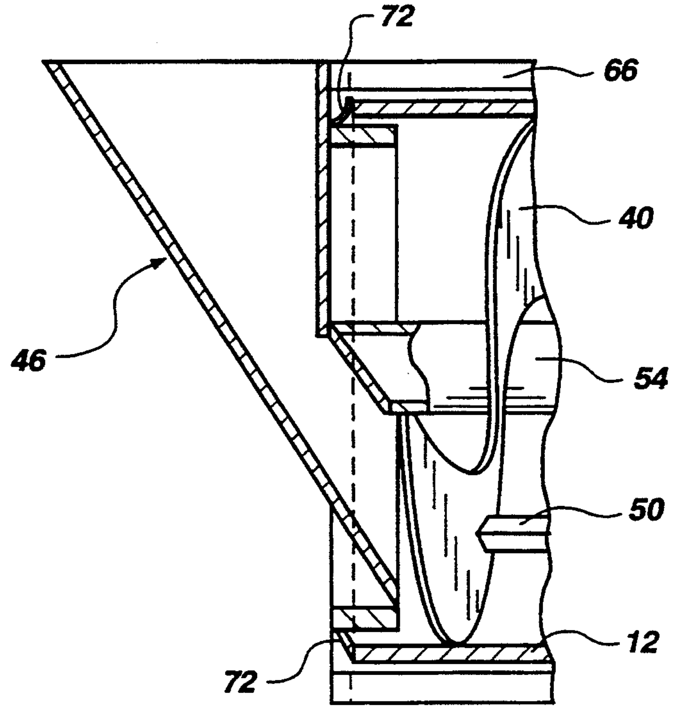
FIG. 3 is an enlarged side sectional view taken at the inlet end of a pasteurization chamber.

Referring initially to FIGS. 1-4 of the drawings, a sludge treatment module 10 of the present invention comprises a tubular, rolled plate of steel, stainless steel or other suitable material pasteurization chamber 12 of circular cross section rotationally supported by trunnion assemblies 14 and 16 located about one-fourth the length of chamber 12 inwardly from the ends thereof. It should be noted that, where specific materials are mentioned herein, such reference is by way of example only, and is not a limitation of the invention. Steel roller tracks 18 and 20 disposed about and welded to chamber 12 ride on hardened steel wheels 100 with integral anti-friction bearings carried on shafts 102 supported by the trunnion assemblies (see FIG. 2). If desired, wheels 100 may have a recessed bearing surface flanked by side-walls as shown, for enhancing longitudinal stability of chamber 12. Chamber 12 is rotationally driven about longitudinal axis 22 by drive means 24 which as shown comprises an electric motor 26, a variable speed reduction gear set 28 and a drive gear 30 which engages sprocket 32 secured about the exterior of chamber 12 via a drive chain 34.

The interior of chamber 12 includes a sludge transport means preferably comprising a helical, hollow-centered auger 40 having a substantially continuous flight formed of steel plate and secured as by welding at its outer edge 42 to the wall 44 of chamber 12. Alternatively, auger 40 may be secured to chamber 12 at each end thereof. Auger 40 extends substantially the entire length of chamber 12 from immediately proximate a non-rotating inlet hopper 46 at one end thereof to and over one or more discharge ports 48 extending though chamber wall 44 at the opposite end. Also on the interior of chamber 12 and secured to the wall 44 are a plurality of circumferentially spaced, longitudinally extending sludge lifters 50. As shown, sludge lifters 50 comprise three angle iron segments spaced at equal intervals and having their open sides facing the chamber wall 44 and welded thereto. The pitch of auger 40 and the number of lifters 50 may depend on the desired sludge residence time in chamber 12, the length thereof, and the operating temperature of chamber 12. As with chamber 12, auger 40 and lifters 50 may be formed of steel, stainless steel or other suitable material.

The center opening 52 in auger 40 is coaxial with longitudinal axis 22 and larger than the diameter of a pipe gas distribution tube 54 of steel, stainless steel or other suitable material which extends through the center of chamber 12. Gas distribution tube 54 is preferably stationary and suspended at one end 56 from inlet hopper 46 and at the other end 58 from a hot gas source. The hot gas source preferably comprising a multi-fuel gas burner 60 having a dilution air fan (not shown) integral therewith. As used herein, the term "hot gas" encompasses combustion products as well as heated air or other gases, and includes gases of whatever nature heated above ambient temperature. Gas temperature within distribution tube 54 is controlled by selective injection of dilution air responsive to a thermocouple or other heat sensor 62 located at the distal end 56 of tube 54. Hot gas outlets 64 extend through the wall of gas distribution tube 54 substantially along the entire length of the tube disposed within chamber 12. Outlets 64 may not be uniformly disposed about the circumference of tube 54, but are preferably concentrated in a circumferential sector X extending from about 120° from top dead center (TDC) to about 300° therefrom, taken in the primary or normal direction of rotation of chamber 12. The most preferred sector Y for location of outlets 64 extends from about 180° to about 240° (assuming that chamber 12 is horizontally oriented).

As shown in FIG. 1, the sludge treatment apparatus 10 may be mounted on any suitable supporting metal framework 66 of appropriate gauge and cross section, such as channel or angle iron or box beams. The framework 66 may be mounted on or comprise an integral part of a trailer or skid unit, although the mounting arrangements suggested are exemplary only and are neither limitations to nor an essential part of the present invention.

Control unit 70 is employed to control the operation of module 10 with respect to the initiation and speed control of the drive means and with respect to operation of gas burner 60 and of the dilution air fan. It is preferred that the dilution air fan be controlled responsive to heat sensor 62, and that an additional thermocouple or other heat sensor or sensors 68 be disposed within chamber 12 and the input therefrom used by control unit 70 to regulate the fuel supply to gas burner 60. The components of control unit 70 will not be described as they are unimportant to the appreciation and practice of the present invention, as well as being commercially available and easily arranged and assembled by one of ordinary skill in the art.

It should be appreciated that a non-circular chamber configuration may be employed, such as hexagonal or octagonal. The pitch of the auger flight may be varied, as previously noted. Thus, sludge transport speed and residence time in the chamber may be varied and adjusted. The aforementioned variable speed reduction gear set may also be used to vary transport speed and residence time. Instead of an auger having continuous flights, a segmented flight auger might be employed. The sludge lifters 50 may comprise flat or curved plates instead of angle iron, and may themselves be oriented in an extended or elongated pitch helix instead of being longitudinally oriented. A different number of circumferential lifter locations than three may be employed, for example two to twelve, the major desired feature of lifters spacing being that the lifters are located substantially equidistant from one another to promote substantially uniform sludge material movement. The lifters themselves may be segmented rather than continuous throughout the length of the chamber, and may be staggered circumferentially. Moreover, the lifter may be secured to the auger flights rather than to the chamber wall, or the auger structure may be secured to the lifters which in turn are secured to the chamber wall.

Figure 4:
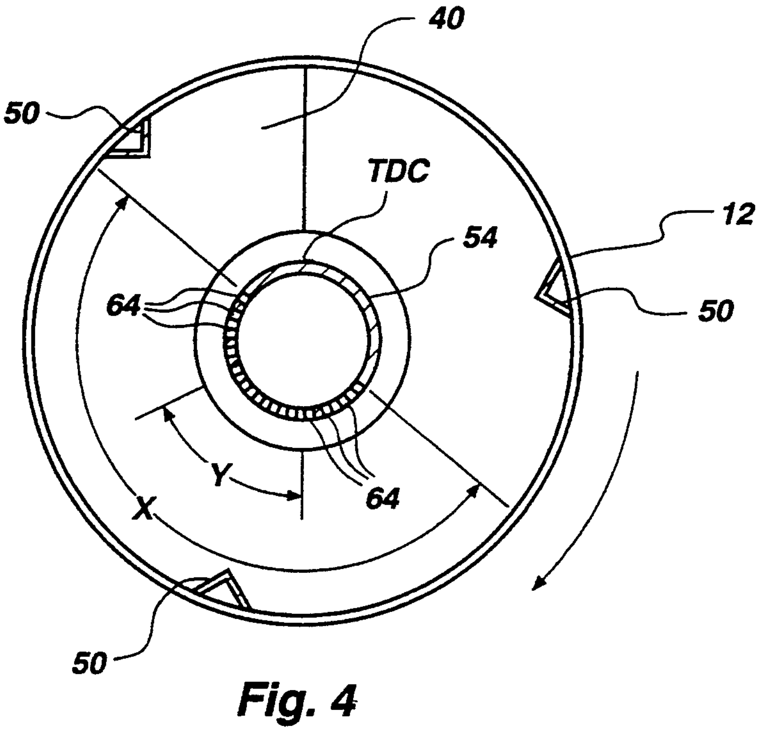
FIG. 4 is a simplified section taken through FIG. 1 along section line 4—4 and FIG. 4A is the same view showing sludge free falling through hot gas streams.
Figure 4A:
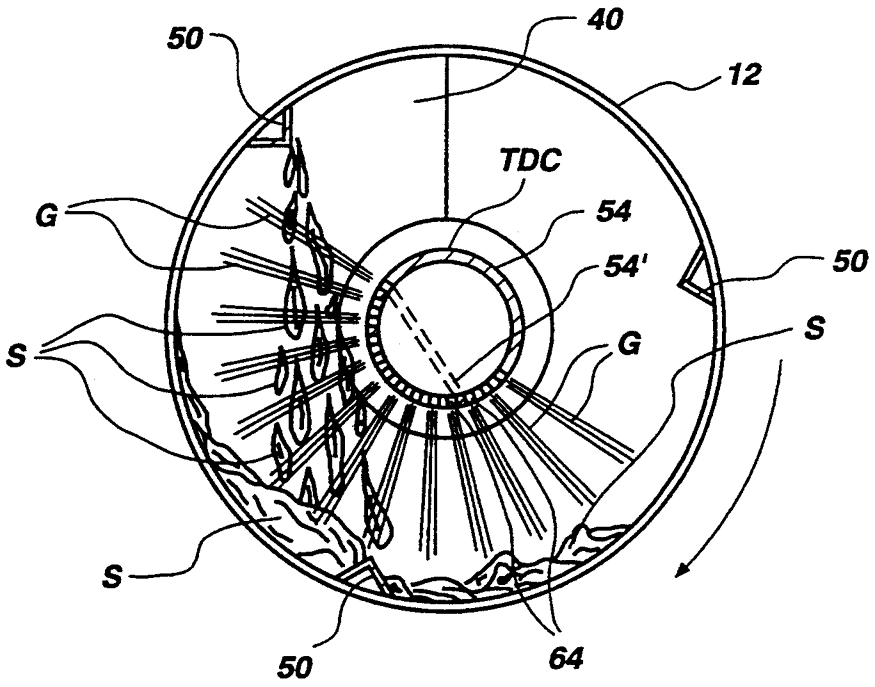

With respect to the gas source and distribution means, it is of course possible to employ a single hot gas source which is fed to multiple distribution tubes 54 for introduction into associated chambers 12 of a series of modules 10 via a manifold and damper system or by connecting the inlet of the first module's tube to the hot gas source and the outlet to the inlet of the next tube in series via connecting tubing. The hot gas source itself may be other than a gas burner, for example an oil burner or a waste burner, such as might already be on site. The hot gas outlets 64 may simply comprise round holes or elongated slots, or may include specifically configured nozzles (such as fan-shaped) to shape and direct the hot gas streams as desired against the falling sludge. As with the pasteurization chamber 12, the gas distribution tube 54 is not necessarily limited to a circular cross section, and may in fact be hexagonal, octagonal, or comprise a portion of circle with one flat side (see FIG. 4A, reference 54') wherein hot gas outlets 64 are located.

It will be appreciated that the rotating chamber 12 and stationary gas distribution tube 54 and sludge feed means 46 may require seal means therebetween to reduce thermal energy loss. Due to the relatively low operating temperatures of the present invention, such seals are easily fabricated from commercially available elastomers and may simply comprise an annular flap 72 secured to one element and resiliently pressing against the other element moving (rotating) with respect thereto to effect a seal (see FIG. 3). Other seal configurations are, of course, possible and within the skill of those practicing the art, and so will not be further described.

While not essential to operation of the invention, it is contemplated that application of thermal insulation to the treatment modules may raise their efficiency in dehydration and pathogen destruction, as well as further reducing the already modest thermal energy required for the treatment process. For example, the pasteurization chamber itself may be insulated by jacketing it with foam insulation in the same manner as pipelines, or the supporting framework for the apparatus may be configured and sized to have rigid foam sheets secured thereto so as to provide an insulated enclosure.

While the exemplary module 10 of the present invention has been depicted in a substantially horizontal orientation, the invention is not so limited, and it is contemplated that the invention may be mounted on an incline if desired to save site space or enhance the transport of sludge solids. Of course, the pitch of the helix of the sludge transport means may be adjusted depending upon the design angle of inclination of the pasteurization chamber, and the size, configuration and direction of the hot gas outlets 64 may also be altered for optimum performance.

Figure 5:
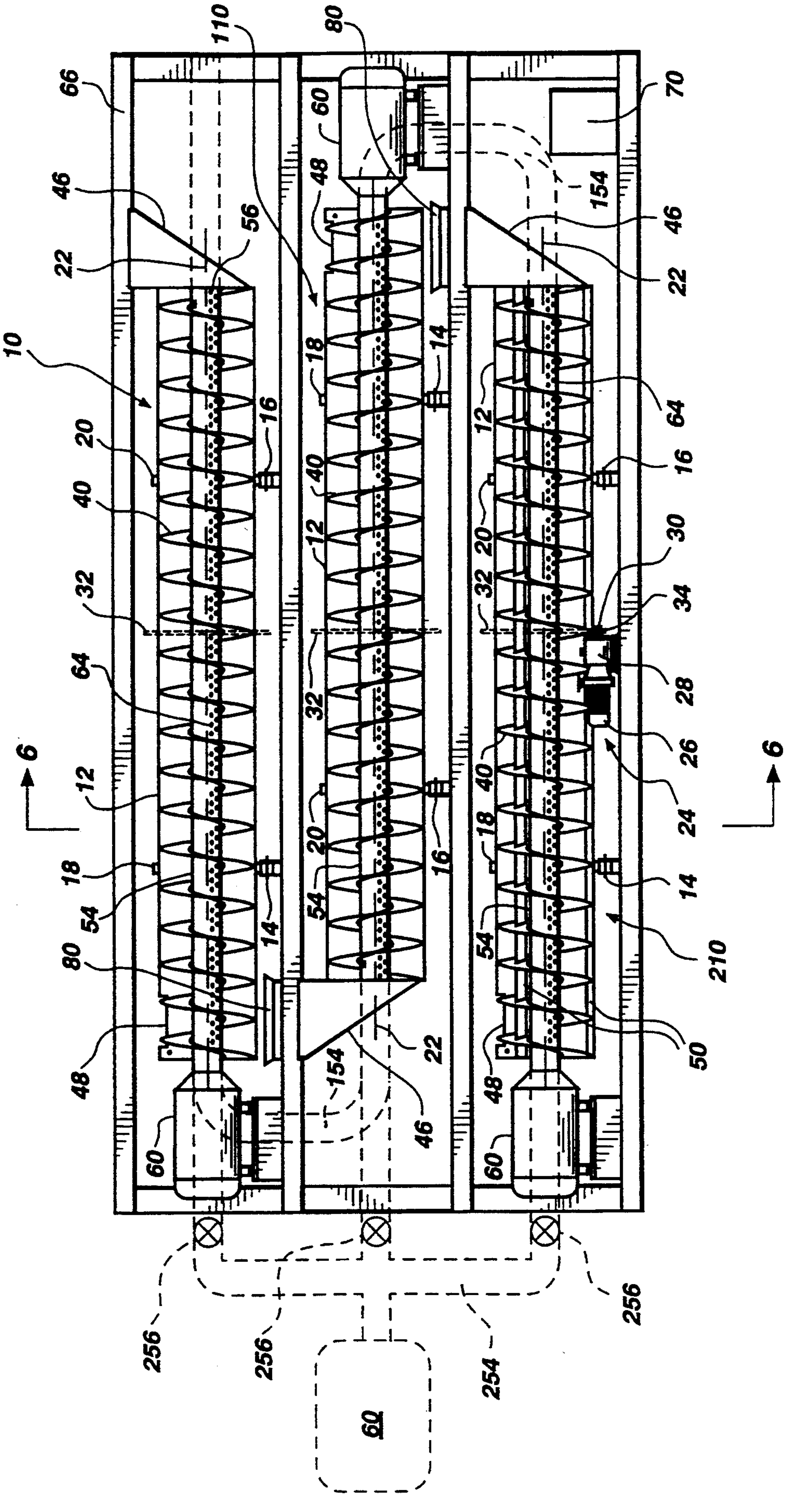
FIG. 5 is a side sectional elevation of three of the sludge treatment modules of the present invention stacked and in series.
Figure 6:
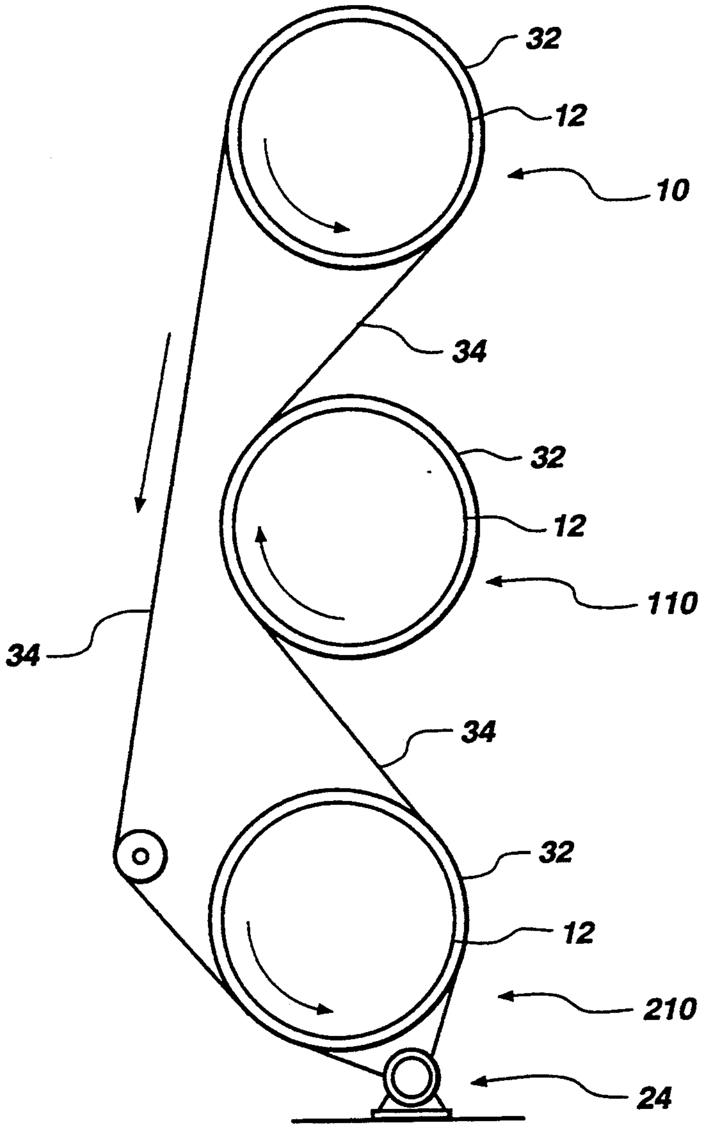
FIG. 6 is a simplified section taken through FIG. 5 along section line 6—6 and illustrating the use of a common chain or belt drive for the three modules depicted therein.

The preferred embodiment depicted in FIGS. 5 and 6 of the drawings, wherein three (3) modules 10, 110 and 210 are stacked and operated in series, includes several noteworthy features. It should be noted at this point that lifters 50 are illustrated in FIG. 5 (as in FIG. 7) only within chamber 12 of module 210 and have been omitted from modules 10 and 110 for clarity.

First, with reference to FIG. 6, a single, continuous drive chain or belt 34 may be employed to drive all three modules 10, 110 and 210. Further, in order to ensure that the sludge does not agglomerate or clump into inordinately large globules, a sizing or delumping device 80 to limit particle size may optionally be interposed between the discharge of module 10 and the inlet of module 110 and/or between the discharge of module 110 and the inlet of module 210. Sizing device 80 may comprise a simple screen or other means known in the art. Additionally, FIG. 5 depicts alternative hot gas distribution configurations, the simplest being the use of a single gas burner 60 and connection tubes 154 extending between all of the gas distribution tubes 54 of the various modules. With such an arrangement, the size and number of the hot gas outlets in each distribution tube 54 may be varied to promote the desired volume of flow into each chamber 12. Another alternative depicted in FIG. 5 is to use a single burner 60 and connect it to the hot gas distribution tubes 54 via a manifold 254, dampers 256 being controlled by control unit 70 responsive to heat sensors 62 in each distribution tube 54 to regulate air flow.

Figure 7:
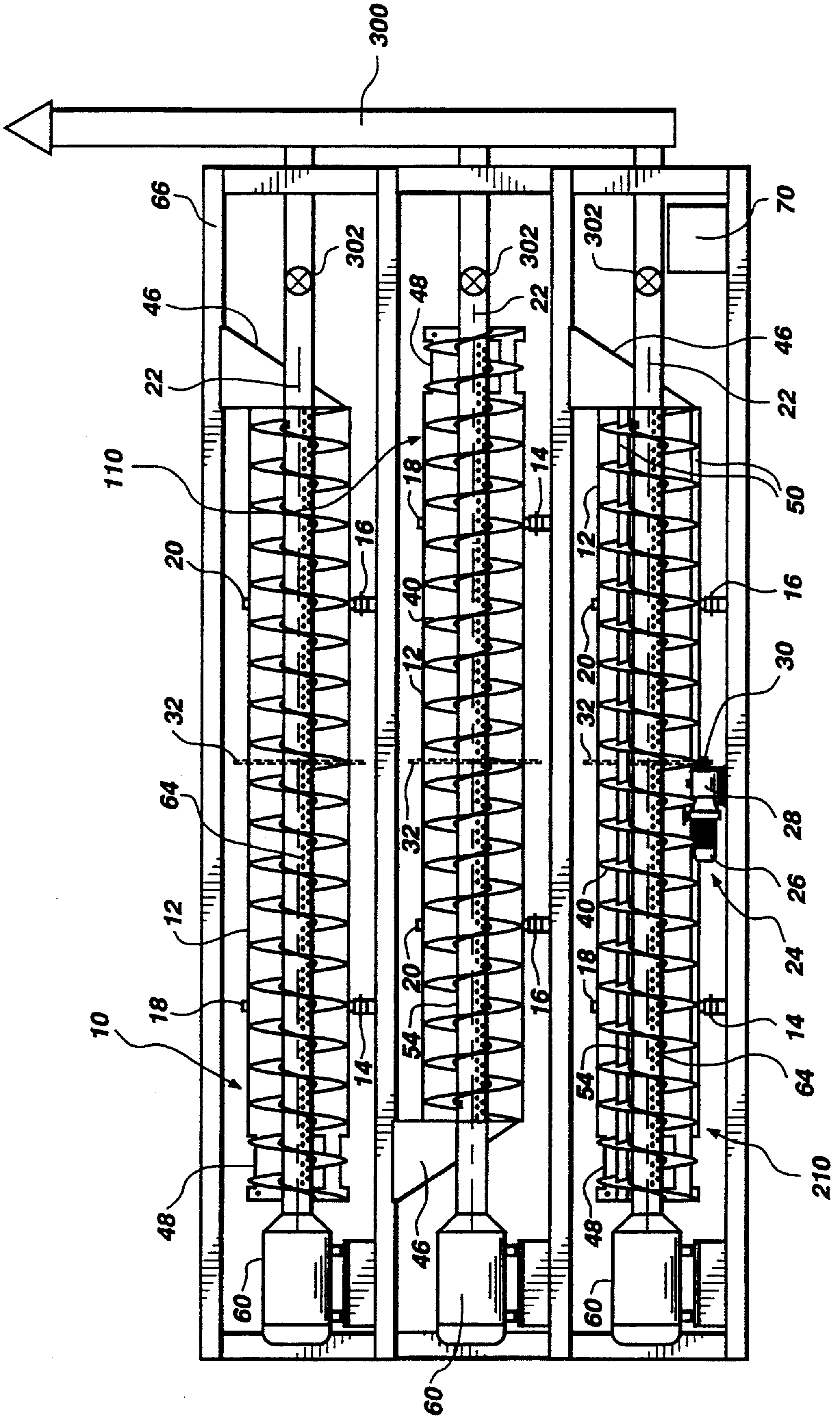
FIG. 7 is an alternative arrangement of three treatment modules in series.

FIG. 7 depicts an alternative three module embodiment of the invention, with all burners 60 at one end and a common exhaust system 300 with dampers 302 for additional control capability by control unit 70. This embodiment also employs a common rotational drive train for all three modules.

It is also contemplated when treatment modules are used in series, that one or more parameters of each module may differ from those of the others. For example, different chamber and/or tube diameters may be employed, different pitch augers may be used, heat input may vary, and the rotational speed may be varied to optimize efficiency and throughput.

To operate the present invention and with reference primarily to FIGS. 1, 5, and 7 the control unit 70 is employed to initiate the firing of gas burners 60 for a predetermined preheat period, typically about ten to twenty minutes, so that the hot gases, for example in the 500° to 750° F. temperature range, from burners 60 raise chambers 12 up to their operating temperature range. During the preheat period and after some period of time, rotation of chambers 12 is commenced at some predetermined rate (such as one revolution per minute) to substantially uniformly heat them. During the preheat period, any suitable dewatering device known in the art, such as a belt filter press, is initiated to commence the dewatering of sludge to be treated by the present invention. When chamber operating temperatures are reached, dewatered sludge at a ten to thirty-five percent solids content is delivered, preferably continuously, to inlet hopper 46 of module 10 by a belt, bucket, screw or other continuous delivery means, auger 40 then transporting the sludge longitudinally through chamber 12 of module 10 and lifters 50 raising the sludge "S" within the chamber 12 to a point where it releases therefrom due to gravity and falls past the streams of hot gas "G" emanating from outlets 64 (see FIG. 4A), which both aids in drying the sludge and in destroying pathogens therein. Sludge "S" not only free falls from lifters 50, but as chamber 12 rotates sludge "S" is raised by the lifters and the upwardly-moving chamber wall 44 to a point where it slumps and tumbles down the chamber wall and is contacted by gas streams "G". Thus, the term "fall" as used herein is not limited to freely falling sludge, but encompasses the slumping and tumbling sludge as well. This process continues until chamber discharge ports 48 are reached by the moving sludge, at which point the sludge drops through ports 48 into the inlet hopper of the next lower module 110 and the drying and pathogen destruction process continues, the sequence again being repeated through module 210 until the sludge exits the discharge ports 48 of module 210 and is removed by some transport means such as a conveyor belt, for disposition.

The temperatures employed for the required pathogen destruction and adequate drying of the sludge are a function of the water content of the sludge and the residence time of the sludge in the pasteurization chamber, and are easily ascertainable by one of ordinary skill in the art. For example, raising the sludge to a temperature of 160° F. for a residence time of at least thirty minutes is believed to be adequate to achieve the desired pathogen destruction.

While the present invention has been disclosed with reference to certain exemplary embodiments, it is not so limited, and those of ordinary skill in the art will appreciate that many additions, deletions and modifications may be made to these embodiments without departing from the scope of the invention as hereinafter claimed.

What is claimed is:

1. An apparatus for the application of heat to sludge for reduction of the pathogen content thereof, comprising:

- at least one substantially tubular chamber having a central longitudinal axis;
- means for supporting said at least one chamber for rotation about said longitudinal axis;
- means for driving said at least one chamber rotationally in primarily one direction about said central longitudinal axis;
- means located within said at least one chamber throughout substantially the entire longitudinal extent thereof for transporting said sludge longitudinally through said at least one chamber responsive to rotation of said at least one chamber;
- means located within said at least one chamber throughout substantially the entire longitudinal extent thereof for lifting said sludge upwardly responsive to rotation of said at least one chamber and for releasing said sludge to fall in said at least one chamber proximate said longitudinal axis responsive to gravity;
- a source of hot gas for introduction into said at least one chamber; and
- means in communication with said hot gas source for distributing said hot gas substantially axially through substantially the entire longitudinal extent of said at least one chamber for contacting said falling sludge with said hot gas throughout substantially the entire longitudinal extent of said at least one chamber.

2. The apparatus of claim 1, wherein said means for transporting said sludge comprises helical auger means having a hollow center proximate said longitudinal axis, extending substantially the entire longitudinal extent of said at least one chamber and secured thereto, and wherein said hot gas distribution means is oriented to direct said hot gas through said hollow center.

3. The apparatus of claim 1, wherein said means for lifting said sludge comprises at least one longitudinally extending element adjacent the inner wall of said chamber and extending inwardly therefrom.

4. The apparatus of claim 3, wherein said at least one longitudinally extending element comprises a plurality of such elements circumferentially spaced about the interior of said chamber.

5. The apparatus of claim 3, wherein said at least one element extends substantially the entire longitudinal extent of said chamber.

6. The apparatus of claim 1, wherein said hot gas source comprises a gas-fired burner.

7. The apparatus of claim 1, wherein said hot gas distribution means comprises a substantially axially central hot gas distribution tube extending substantially the entire length of said at least one chamber.

8. The apparatus of claim 7, further including hot gas outlet means extending through the wall of said hot gas distribution tube along substantially the entire longitudinal extent thereof.

9. The apparatus of claim 8, wherein said hot gas outlet means are located primarily in a circumferential sector of said hot gas distribution tube extending from about 120° from top dead center to about 300° therefrom, taken in the primary direction of rotation of said chamber.

10. The apparatus of claim 9, wherein said circumferential sector preferably comprises about 180° to about 240° from top dead center.

11. The apparatus of claim 1, further including means for substantially continuously feeding said sludge to an inlet end of said at least one chamber.

12. The apparatus of claim 11, further including at least one discharge port in said at least one chamber for discharging sludge therefrom at an outlet end thereof opposite said inlet end.

13. The apparatus of claim 1, wherein said at least one chamber comprises a plurality of chambers in series.

14. The apparatus of claim 12, wherein said hot gas source comprises a common hot gas source for said plurality of chambers.

15. The apparatus of claim 12, wherein said means for driving comprises a common drive means for said plurality of chambers.

16. The apparatus of claim 11, further comprising sludge sizing means associated with the inlet of at least one of said plurality of chambers.

17. The apparatus of claim 1, wherein said hot gas source includes a means for providing dilution air to said hot gas.

18. The apparatus of claim 17, further including means for regulating the volume of said dilution air responsive to temperature sensed within said gas distribution tube.

19. The apparatus of claim 1, further including means for regulating fuel provided to said hot gas source responsive to temperature sensed within said at least one chamber.

20. The apparatus of claim 1, wherein said means for lifting and releasing said sludge is oriented and positioned to release said lifted sludge to fall in substantially perpendicular to the orientation of said hot gas distribution means and through hot has emanating therefrom.

21. The apparatus of claim 8, wherein said means for lifting and releasing said sludge is oriented and positioned to release said lifted sludge to fall predominantly laterally adjacent said hot gas distribution tube and through streams of hot gas from at least some of said hot gas outlets means.

* * * * *